(12) United States Patent
Yu

(10) Patent No.: US 8,891,515 B2
(45) Date of Patent: Nov. 18, 2014

(54) METHOD FOR NODE COMMUNICATION

(75) Inventor: Lin Yu, Shanghai (CN)

(73) Assignee: Inventec Corporation, Taipei (TW)

( * ) Notice: Subject to any disclaimer, the term of this patent is extended or adjusted under 35 U.S.C. 154(b) by 64 days.

(21) Appl. No.: 13/411,642

(22) Filed: Mar. 5, 2012

(65) Prior Publication Data

US 2013/0107878 A1   May 2, 2013

(30) Foreign Application Priority Data

Oct. 27, 2011   (CN) .......................... 2011 1 0332452

(51) Int. Cl.
*H04L 12/50* (2006.01)
*H04L 12/64* (2006.01)

(52) U.S. Cl.
CPC .................................. *H04L 12/6418* (2013.01)
USPC ........... 370/376; 370/360; 370/345; 370/329; 370/252; 370/346; 370/347; 370/348

(58) Field of Classification Search
CPC ....... H04L 43/10; H04L 67/10; H04L 67/104; H04N 5/2354; H04W 16/14; H04W 36/165; H04W 36/26; H04W 40/24; H04W 52/0261; G05B 15/02; G06F 17/30194; G06F 1/26; G06F 11/1464; G06F 11/3672; G06F 13/10; G06F 15/76; G06F 21/561; G06F 8/30; G06F 8/70

USPC ......... 370/360, 376, 331, 252, 329, 349, 345, 370/346, 347, 348

See application file for complete search history.

(56) References Cited

U.S. PATENT DOCUMENTS

| | | | |
|---|---|---|---|
| 8,326,152 B2* | 12/2012 | Van Veen et al. ................ | 398/72 |
| 2003/0101347 A1* | 5/2003 | Letsinger ...................... | 713/182 |
| 2007/0286184 A1* | 12/2007 | Miyazaki ...................... | 370/382 |
| 2007/0287542 A1* | 12/2007 | Miyazaki et al. ............... | 463/39 |
| 2012/0185919 A1* | 7/2012 | Macauley .......................... | 726/3 |
| 2012/0310987 A1* | 12/2012 | Dragojevic et al. ........... | 707/792 |

* cited by examiner

*Primary Examiner* — Christopher Grey
*Assistant Examiner* — Oussama Roudani
(74) *Attorney, Agent, or Firm* — CKC & Partners Co., Ltd.

(57) ABSTRACT

A method for node communication for use in a rack system is provided. The method includes providing a detecting unit for connecting to the nodes via a circuit switching device; pre-defining a linked list in which a limit of times for the detecting unit to communicate with each of the nodes is set; sequentially selecting one node of the nodes so that the detecting unit is connected to the one node via the circuit switching device; adding an assigned communication parameter between the detecting unit and the one node selected to the linked list, wherein a number of times of communication corresponding to the assigned communication parameter is not greater than the limit of times; and performing communication between the detecting unit and the one node selected in accordance with the assigned communication parameter in the linked list.

6 Claims, 2 Drawing Sheets

METHOD FOR NODE COMMUNICATION

RELATED APPLICATIONS

This application claims priority to China Application Serial Number 201110332452.6, filed Oct. 27, 2011, which is herein incorporated by reference.

BACKGROUND

1. Field of Invention

The present invention relates to a method for node communication. More particularly, the present invention relates to a method for node communication suitable for use in a detecting unit.

2. Description of Related Art

Cloud computing is an operating manner based on Internet for sharing software and hardware resources and information, wherein a computing end will fulfill a request whenever a user issue an instruction via Internet. Since the computing end includes several central processing units (CPUs) used for computing and sharing hardware resources, the cloud computing has the advantages of fast computation and cost saving. Currently, the cloud computing has been widely applied on web search engines, e-mail servers, etc.

In the cloud computing, a rack system, a plurality of nodes and a detecting unit are adopted, wherein the detecting unit is used for implementing communication with the nodes. A rack management controller (RMC) is further disposed in the rack system, and is linked to the detecting unit of the rack system for administrating and controlling the entire rack system. The number of times of communication is different for the detecting unit to perform communication with one node each time. The detecting unit sometimes needs to obtain many messages regarding one node, such as a BIOS (Basic Input/Output System) message, a CPLD (Complex Programmable Logic Device) message, a BMC (Baseboard Management Controller) message, etc.

The method adopted by a conventional skill is to first obtain all messages of a node when performing communication with the node, and then perform communication with the next node. It is not sure how long the maximum communication time with each nod will last, thus resulting in a real-time problem. Hence, there is a need to develop a scheme for overcoming the aforementioned difficulty.

SUMMARY

An object of the present invention is to provide a method for node communication for a detecting unit.

One aspect of the present invention relates to a method for node communication for use in a rack system including a plurality of nodes. The method for node communication includes: providing a detecting unit for connecting to the nodes via a circuit switching device; predefining a linked list in which a limit of times for the detecting unit to communicate with each of the nodes is set; sequentially selecting one node of the nodes so that the detecting unit is connected to the one node via the circuit switching device; adding an assigned communication parameter between the detecting unit and the one node selected to the linked list, wherein a number of times of communication corresponding to the assigned communication parameter is not greater than the limit of times; and performing communication between the detecting unit and the one node selected in accordance with the assigned communication parameter in the linked list.

According to one embodiment of the present invention, the linked list is an FIFO (First-In First-Out) linked list.

According to one embodiment of the present invention, the assigned communication parameter includes a plurality of communication parameters with different priorities, and a communication parameter with a higher priority is added to the linked table prior to another communication parameter with a lower priority.

According to one embodiment of the present invention, the method for node communication further includes: determining if a time of communication between the detecting unit and the one node selected is successful, wherein if successful, the assigned communication parameter corresponding to the time of communication is deleted from the linked list; and if not successful, communication between the detecting unit and the one node selected is performed again according to a predetermined number of times of re-execution by using the assigned communication parameter in the linked table.

According to one embodiment of the present invention, the method for node communication further includes: when the assigned communication parameter is not included in the linked table, another node of the nodes is selected, so that the detecting unit is connected to the another node selected via the circuit switching device, and communication between the detecting unit and the another node selected is performed.

According to one embodiment of the present invention, the method for node communication further includes: recording the number of times of communication between the detecting unit and the node selected, wherein, when the number of times of communication reaches the limit of times, another node of the nodes is selected, so that the detecting node is connected to the another node selected via the circuit switching device, and communication between the detecting unit and the another node selected is performed.

According to one embodiment of the present invention, the method for node communication further includes: sequentially connecting the detecting unit to the nodes via the circuit switching device, and performing communication between the detecting unit and the nodes, thereby completing a first round of communication; and after the detecting unit have completed the first round of communication with all of the nodes in the rack system, performing a second round of communication with the nodes, wherein during the second round of communication, communication parameters between the detecting unit the nodes are different from those of the first round of communication.

According to one embodiment of the present invention, each of the nodes is a LAN (Local Area Network) switch, a JBOD (Just a Bunch of Disks) or a motherboard.

According to one embodiment of the present invention, the detecting unit communicates with the nodes via the circuit switching device.

By using the FIFO linked list to control the number of times of communication between the detecting unit and one node each time, even if many messages are required to obtain from the one node, the messages can be obtained through many times of communication. Hence, it is ensured that the maximum time of the communication between the detecting unit and one node each time can be controlled.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
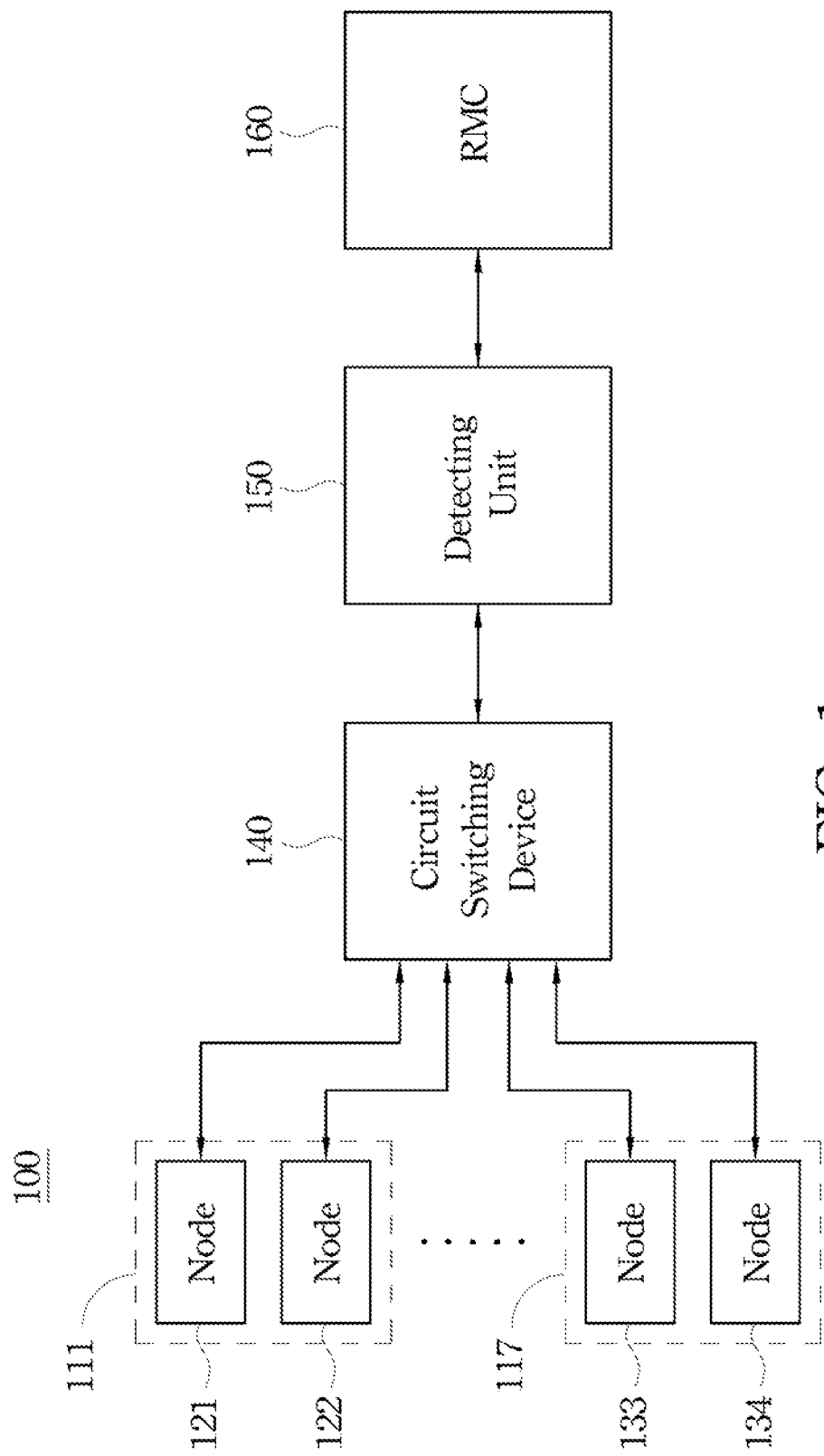
FIG. 1 is a schematic block diagram showing a rack system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic block diagram showing a rack system 100 according to an embodiment of the present invention. The rack system is suitable for use in a server or similar apparatus. The rack system 100 may include seven chassis, i.e. from a first chassis 111 to a seventh chassis 117, and each chassis includes two nodes, i.e. the first chassis 111 includes a node 121 and a node 122; and the seventh chassis 117 includes a node 133 and a node 134. Hence, the rack system 100 may include fourteen nodes. In practice, each of the nodes can be a LAN switch, a JBOD or a motherboard.

The rack system 100 may further include a circuit switching device 140, a detecting unit 150 and a RMC 160. The detecting unit 150 may communicate with the RMC 160 via a network port. After receiving a request from the RMC 160, the detecting unit 150 may perform communication with the nodes 121-134 via the circuit switching device 140, and send the communication results back to the RMC 160. The communication can be performed in a one-to-one manner. For example, the detecting unit 150 first communicates with the first node 121, and then is switched to communicate with the second node 122.

In practice, the communication can be an action of accessing the messages stored in the node, or another request. Further, the circuit switching device 140 can be an intelligent platform management bus, an inter-integrated circuit switch (I²C Switch) or the like.

According to another embodiment of the present invention, a rack system includes a plurality of detecting units, wherein each of the detecting units communicates with respective nodes via a circuit switching device. For example, the rack system includes five detecting units, and each detecting unit communicates with fourteen nodes in the same chassis, and thus the rack system includes seventy nodes. It should be understood that the aforementioned numbers are merely stated as an example for explanation, and are not used for limiting the present invention, and those who are skilled in the art may adjust the numbers flexibly in accordance with actual needs.

Figure 2:
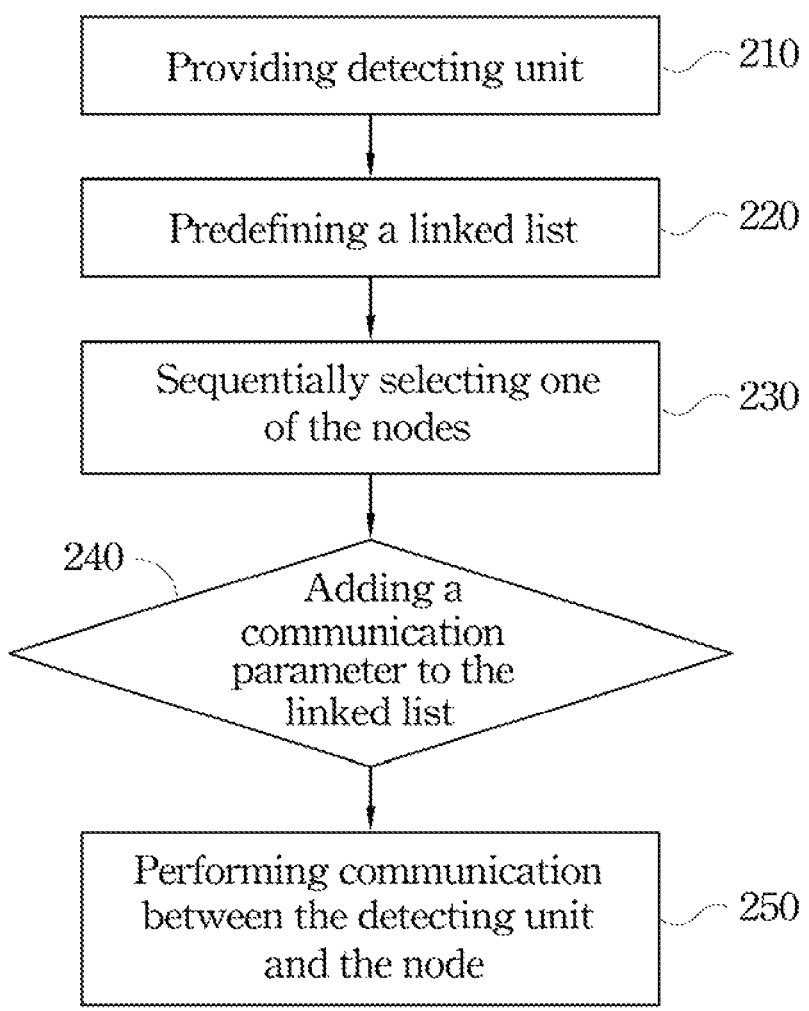
FIG. 2 is a flow chart showing a method for node communication according to an embodiment of the present invention.

Referring to FIG. 2, FIG. 2 is a flow chart showing a method 200 for node communication according to an embodiment of the present invention. The method 200 can be applied to the rack system 100 including a plurality of nodes as shown in FIG. 1. In the same rack system, since a lot of nodes are included, if the conventional method for node communication is adopted, the detecting unit communicates with one node after the communication with the previous node is completed, and when the detecting unit communicates with the last node, a period of time has passed. For example, a time period for communicating with each node is 20 seconds, so that the information of the last node obtained is not prompt, thus resulting in a real-time problem. Especially when the node is just plugged in, the amount of information of the node is relatively large, and thus the real-time problem is more obvious. Hence, a method for communicating with nodes in turn should be adopted. By using the method 200 for node communication, the number of times of communication is with one nod is limited, and thus the time for communicating with one node can be controlled, thereby resolving the real-time problem. The method 200 for node communication will be explained in detail below.

The method 200 for node communication may include steps 210-270. In step 210, the detecting unit 150 is provided, and is connected to a node (for example, the node 121) via the circuit switching device 140. In step 220, a linked list is predefined, and in the linked list, a limit of times for the detecting unit 150 to communicate with each of the nodes is set. Since each node has a different data amount, when the detecting unit 150 performs communication, the number of times for communicating with each node has to be limited, in order to prevent the communication time from being too long and lacking of promptness.

In step 230, one of the nodes is sequentially selected so that the detecting unit 150 is connected to the selected node via the circuit switching device 140. Thereafter, in step 240, an assigned communication parameter between the detecting unit 150 and the selected node is added to the linked list, wherein a number of times of communication corresponding to the assigned communication parameter is not greater than the limit of times. For achieving the promptness of communication, the communication between the detecting unit 150 and the selected node has to follow the limit of times. If the number of times of communication corresponding to the assigned communication parameter is greater than the limit of times, the communication time between the detecting unit 150 and the selected node will be too long, thus causing that the information of other nodes obtained to lack promptness.

In step 250, the communication between the detecting unit 150 and the selected node is performed in accordance with the assigned communication parameter in the linked list, thereby accessing messages in the selected node. The messages can be a BIOS message, a CPLD message, a BMC message, etc.

According to one embodiment of the present invention, the linked list is an FIFO linked list. In practice, the linked list can be a program which is executed from head to tail. The so-called FIFO is to place the data first inputted on the head of the linked list, thereby achieving the purpose of first outputting the data first inputted.

According to one embodiment of the present invention, the assigned communication parameter includes a plurality of communication parameters with different priorities. A communication parameter with a higher priority is added to the linked table prior to another communication parameter with a lower priority. Since one node may be corresponding to several communication parameters with different priorities, the FIFO linked list is used for achieving the purpose of executing the communication parameters from high to low priorities, wherein the communication parameter with the highest priority is placed on the head of the linked list, and the communication parameter with the lowest priority is placed on the tail of the linked list. In other words, according to different priorities, the communication parameters are arranged from the head to the tail of the linked list, and the aforementioned effect can be achieved by executing the communication parameters in sequence. Hence, when one communication parameter is executed first and the other communication parameter is executed later, it means that the priority of the one communication parameter is higher than that of the other communication parameter.

According to one embodiment of the present invention, the method 200 for node communication further includes: determining if a time of communication between the detecting unit 150 and the selected node is successful. If the time of communication is successful, the communication parameter corresponding to the time of communication is deleted from the linked list. If the time of communication is not successful, communication between the detecting unit 150 and the selected node is performed again according to a predetermined number of times of re-execution by using the communication parameter in the linked table.

This is because the execution of each communication parameter is equivalent to a different action. When the linked table is executed, the parameters which have been executed successfully (i.e. the actions corresponding to the parameters have been completed) are deleted from the linked list, thereby avoiding repeated execution; and the parameters which have not been executed successfully are re-executed according to a predetermined number of times of re-execution. For example, the predetermined number of times of re-execution is set to 3, so that the parameters executed unsuccessfully are re-executed for at most three times. If the parameters are re-executed at the third time and the execution is still not executed successful, the parameters are deleted from the linked list. The predetermined number of times of re-execution can be set different in accordance with actual needs.

According to one embodiment of the present invention, the method 200 for node communication further includes: when the communication parameter assigned between the detecting unit 150 and the selected node is not included in the linked table, another node of the nodes is selected, so that the detecting unit 150 is connected to the another node selected via the circuit switching device 140, and communication between the detecting unit and the another node selected is performed. When the linked list does not contain the communication parameter of one certain node, it means that the communication with the node is ended and communication with another node is performed, thereby controlling the communication time with the another node for solving the real-time problem caused by node communication.

According to one embodiment of the present invention, the method 200 for node communication further includes: recording the number of times of communication between the detecting unit 150 and the selected node, wherein, when the number of times of communication reaches the limit of times, another node of the nodes is selected, so that the detecting node is connected to the another selected node via the circuit switching device 140, and communication between the detecting unit and the another selected node is performed.

For controlling the communication time with one node, the number of times for accessing the messages in the node has to be counted during the communication with the node, and has to be compared with a predetermined number of times of communication (the limit of times) to determine if the number of times for accessing the messages in the node is greater than the predetermined number of times of communication. When the number of times for accessing the messages in the node is greater than the predetermined number of times of communication, communication with another node is started for preventing the communication time with the same node from being too long. Further, the predetermined number of times of communication can be such as 5 times, and can be determined in accordance with the times required for communication with one node and thus can be adjusted according to actual needs. Alternatively, the predetermined number of times of communication can be set specifically by a system designer.

According to one embodiment of the present invention, the method 200 for node communication further includes: sequentially connecting the detecting unit 150 to the nodes via the circuit switching device 140, and performing communication between the detecting unit 150 and the nodes, thereby completing a first round of communication with each of the nodes; and after the detecting unit 150 has completed the first round of communication with all of the nodes in the rack system, performing, by the detecting unit 150, a second round of communication with the nodes since some data in some of the nodes have not yet been executed, wherein during the second round of communication, communication parameters between the detecting unit the nodes are different from those of the first round of communication, so that no same communication parameters will be executed twice.

As to the linked list used in the method 200 for node communication, the linked list is designed according to the instructions provided by the RMC, and the communication parameters in the linked list may include the location of node desired to be communicated with, a basic message, a communication parameter, a predetermined number of times of communication.

Since the rack system may contain a plurality of chassis, and each chassis may further contain a plurality of nodes, the parameters corresponding to the locations of the nodes have to be differentiable. Thus, the location of a node may include the number of the chassis in which the node is located (such as the first chassis 111 or the second chassis 112), and the number of the node (such as the node 121 and the node 122). When the linked list is executed, a matching step will be performed to find a node matched with a parameter in accordance with the node location of the parameter. After the node matched with the parameter is found, a communication action with the node will then be performed.

As to the communication action with the node, it is achieved by the communication parameters including the message in the node to be accessed (such as a BIOS (Basic Input/Output System) message), etc.

Hence, in order to resolve the real-time problem occurring in node communication, the linked list is needed to be used. When one certain node is required to be communicated, communication parameters corresponding to the node are placed in the linked list, and then the communication parameters in the linked list are retrieved at the place (such as an intelligent power detecting unit) performing communication with the node in accordance with a predetermined number of times of communication which is defined in advance, and the messages corresponding to the communication parameters are accessed, thereby completing the communication and computing the number of times of communication with the same node, thus resolving the problem of too long communication time with the same node.

By using the FIFO linked list, the communication with the higher priority is first performed and the communication with the lower priority is performed later. Since the FIFO scheme is executed from the head of the linked list. Therefore, the communication parameters can be assigned with different priorities according to requirements, and the communication parameter with the lowest priority is placed at the tail of the linked list, and the communication parameter with the highest priority is placed at the head of the linked list, and thus the communication parameter with the highest priority will be executed first during the method for node communication.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for node communication for use in a rack system comprising a plurality of nodes, the method comprising:
   providing a detecting unit for connecting to the nodes via a circuit switching device;
   predefining a linked list in which a limit of times for the detecting unit to communicate with each of the nodes is set, wherein each of the nodes is a LAN (Local Area Network) switch, a JBOD (Just a Bunch of Disks) or a motherboard;
   sequentially selecting one node of the nodes so that the detecting unit is connected to the one node via the circuit switching device;
   adding an assigned communication parameter between the detecting unit and the one node selected to the linked list, wherein a number of times of communication corresponding to the assigned communication parameter is not greater than the limit of times;
   performing communication between the detecting unit and the one node selected in accordance with the assigned communication parameter in the linked list to access message in the one node, wherein the message is a BIOS (Basic Input/Output System) message, a CPLD (Complex Programmable Logic Device) message or a BMC (Baseboard Management Controller) message;
   recording the number of times of communication between the detecting unit and the node selected, wherein, when the number of times of communication reaches the limit of times, another node of the nodes is selected, so that the detecting unit is connected to the another node selected via the circuit switching device, and communication between the detecting unit and the another node selected is performed; and
   determining if a time of communication between the detecting unit and the one node selected is successful, wherein if successful, the assigned communication parameter corresponding to the time of communication is detected from the linked list; and
   if not successful, communication between the detecting unit and the one node selected is performed again according to a predetermined number of times of re-execution by using the assigned communication parameter in the linked list, wherein when the predetermined number of times of re-execution is reached and the communication between the detecting unit and the one node selected is not successful, the assigned communication parameter corresponding to the time of communication is deleted from the linked list,
   wherein a communication time between the detecting unit and the node selected is limited by limiting the number of times of communication between the detecting unit and the node selected.

2. The method as claimed in claim 1, wherein the linked list is an FIFO (First-In First-Out) linked list.

3. The method as claimed in claim 1, wherein the assigned communication parameter includes a plurality of communication parameters with different priorities, and a communication parameter with a higher priority is added to the linked list prior to another communication parameter with a lower priority.

4. The method as claimed in claim 1, further comprising:
   when the assigned communication parameter is not included in the linked list, another node of the nodes is selected, so that the detecting unit is connected to the another node selected via the circuit switching device, and communication between the detecting unit and the another node selected is performed.

5. The method as claimed in claim 1, further comprising:
   sequentially connecting the detecting unit to the nodes via the circuit switching device, and performing communication between the detecting unit and the nodes, thereby completing a first round of communication; and
   after the detecting unit has completed the first round of communication with: all of the nodes in the rack system, performing, by the detecting unit, a second round of communication with the nodes, wherein during the second round of communication, communication parameters between the detecting unit and the nodes are different from those of the first round of communication.

6. The method as claimed in claim 1, wherein the detecting unit communicates with the nodes via the circuit switching device.

* * * * *